United States Patent
DiFoggio

(10) Patent No.: US 9,506,338 B2
(45) Date of Patent: Nov. 29, 2016

(54) DOWNHOLE COOLING WITH ELECTROCALORIC EFFECT

(71) Applicant: Baker Hughes Incorporated, Houston, TX (US)

(72) Inventor: Rocco DiFoggio, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 681 days.

(21) Appl. No.: 13/927,809

(22) Filed: Jun. 26, 2013

(65) Prior Publication Data

US 2015/0000899 A1    Jan. 1, 2015

(51) Int. Cl.
| E21B 47/06 | (2012.01) |
| E21B 47/01 | (2012.01) |
| G01V 11/00 | (2006.01) |

(52) U.S. Cl.
CPC ............ *E21B 47/011* (2013.01); *G01V 11/002* (2013.01)

(58) Field of Classification Search
CPC ................................ E21B 47/65; E21B 47/06
USPC ....................................................... 73/152.12
See application file for complete search history.

(56) References Cited

U.S. PATENT DOCUMENTS

| 2006/0086506 A1* | 4/2006 | Golla .................... E21B 47/011 166/302 |
| 2006/0213660 A1* | 9/2006 | DiFoggio .............. E21B 47/011 166/254.2 |
| 2008/0223579 A1* | 9/2008 | Goodwin .............. E21B 47/011 166/302 |
| 2011/0079391 A1* | 4/2011 | Bedouet ................ E21B 47/011 166/302 |
| 2011/0146308 A1* | 6/2011 | Casasanta ............... F25B 21/00 62/113 |

OTHER PUBLICATIONS

He, Jizhou et al., "Regenerative characteristics of electrocaloric Stirling or Ericsson refrigeration cycles," Energy Conversion and Management 43, pp. 2319-2327 (2002).
Mischenko, A. et al., "Giant electrocaloric effect in thin film PbZr0.95TI0.05O3," 5 pp, Univ. of Cambridge, UK, electronic address: am507@cam.ac.uk (2005).
Akcay, G. et al., "Magnitude of the intrinsic electrocaloric effect in ferroelectric perovskite thin films at high electric fields," Applied Physics Letters 90, 252909 (2007).
Epstein, Richard I. et al., "Electrocaloric Devices Based on Thin-Film Heat Switches," Jnl of Applied Physics, LA-UR-09-00321, 16 pp. (2009).

(Continued)

*Primary Examiner* — Lisa Caputo
*Assistant Examiner* — Jamel Williams
(74) *Attorney, Agent, or Firm* — Mossman Kumar & Tyler PC

(57) ABSTRACT

Methods, systems, devices, and products for taking a downhole measurement are presented. The method may include cooling a sensor in a borehole intersecting an earth formation using an electrocaloric material associated with the sensor, wherein the sensor is responsive to a downhole parameter. The method may further include applying an electric field to the electrocaloric material to generate a giant electrocaloric effect. The method may include selecting dimensions, composition, and Curie temperature of the electrocaloric material and characteristics of the electric field sufficient to reduce the nominal temperature of the sensor by at least 20 degrees Celsius, which may result in the sensor being proximate to a target temperature within the nominal operational temperature range of the sensor.

15 Claims, 4 Drawing Sheets

(56) References Cited

OTHER PUBLICATIONS

Lu, S.G., et al., "Elecrocaloric Effect (ECE) in Ferroelectric Polymer Films," Materials Research Institute and Dept. of Electric Engr., 21 pp. (2010).

Lu, S.G., et al., "Organic and Inorganic relaxor ferroelectrics with giant electrocaloric effect," Applied Physics Letters 97, 162904, 3 pp. (2010).

IOR, Carbon Trust, "Refrigeration Road Map," ior.org.uk (2010.

Quintero, M., et al., "Decoupling electrocaloric effect from Joule heating in a solid state cooling device," Instituto de Fisica, Universidade Federal do Rio de Janiero, Ciadade Universitaria, Rio de Janier, 21941-972 Brazil, 7 pp. (2011).

Researchers Carnegie Institution, "Crystals for efficient refrigeration Electrocaloric effect," http://www.rdmag.com/news/2012/11/crystals-efficient-refrigeration?et_cid=2931058&et_rid=54754137&linkid=http%3a%2f%2fwww.rdmag.com%2fnews%2f2012%2f11%2fcrystals-efficient-refrigeration, 2 pp. (2012).

Unknown, "Compact Cooling devices on giant electrocaloric effect dielectronics," Abstract, http://ieeexplore.ieee.org/xpl/login.jsp?tp=&arnumber=6231525&url=http%3A%2F%2Fieeexplore.ieee.org%2Fxpls%2Fabs_all.jsp%3Farnumber%3D6231525 (Date Unknown).

Maidment, Prof. Graeme, "Sustainable Innovation—a technology review," London South Bank Univ., 7 pp. (Date Unknown).

Ulrich, Richard et al., "Comparison of Paraelectric and Ferroelectric Materials for Applications as Dielectrics in Thin Film Integrated Capacitors," Int'l Jnl of Microcircuits and Electronic Packaging, vol. 23, No. 2, 2d Qtr, pp. 172-180 (2000).

Bai, Y, et al., "The giant electrocaloric effect and high effective cooling power near room temperature for BaTiO3 thick film," Jnl of Applied Physics 110, 094103, 3 pp. (2011).

Li, X et al., "Compact Cooling Devices Based on Giant Electrocaloric Effect Dielectrics," Dept. of Elec. Engr., Pennsylvania State Univ, 4 pp. (2012).

Bai, Y. et al., "Kinetic electrocaloric effect and giant net cooling of lead-free ferroelectric refrigerants," Key Laboratory of Environmental Fracture, Univ. Of Science and Tech. Beijing, 13 pp. (Date Unknown).

Int'l Search Report & Written Opinion in PCT/US2014/043866, dtd Oct. 24, 2014.

\* cited by examiner

DOWNHOLE COOLING WITH ELECTROCALORIC EFFECT

FIELD OF THE DISCLOSURE

This disclosure generally relates to borehole tools, and in particular to methods and apparatuses for conducting downhole measurements.

BACKGROUND OF THE DISCLOSURE

Drilling wells for various purposes is well-known. Such wells may be drilled for geothermal purposes, to produce hydrocarbons (e.g., oil and gas), to produce water, and so on. Well depth may range from a few thousand feet to 25,000 feet or more. In hydrocarbon wells, downhole tools often incorporate various sensors, instruments and control devices in order to carry out any number of downhole operations. Thus, the tools may include sensors and/or electronics for formation evaluation, fluid analysis, monitoring and controlling the tool itself, and so on.

SUMMARY OF THE DISCLOSURE

In aspects, the present disclosure is related to methods and apparatuses for estimating at least downhole parameter relating to an earth formation intersected by a borehole.

One general embodiment according to the present disclosure may include a method of taking a downhole measurement. The method may include cooling a sensor in a borehole intersecting an earth formation using an electrocaloric material associated with the sensor, wherein the sensor is responsive to a downhole parameter. The method may further include applying an electric field to the electrocaloric material to generate a giant electrocaloric effect. The method may include selecting dimensions of the electrocaloric material and characteristics of the electric field sufficient to reduce the nominal temperature of the sensor by at least 20 degrees Celsius. The method may include performing a measurement cycle comprising: i) applying the electric field over a first time interval; ii) taking the downhole measurement with the sensor while the sensor is in a target temperature range; and iii) allowing the sensor to return to a nominal borehole operating temperature by removing the electric field and waiting for a second time interval before repeating the measurement cycle.

The method may include selecting the electrocaloric material to have a phase transition Curie temperature within 20 degrees Celsius of the maximum nominal operating temperature of the sensor; and applying the electric field when the temperature of the electrocaloric material is within 20 degrees Celsius of the phase transition Curie temperature.

The sensor may be fixed to the electrocaloric material, or otherwise in thermal connection with the electrocaloric material. The electrocaloric material may be configured to have a phase transition Curie temperature above 200 degrees Celsius. The method may include taking the measurement using the sensor during the cooling. The method may include cooling the sensor by applying the electric field to a plurality of cooling members in sequence, each cooling member comprising the electrocaloric material.

Another general embodiment according to the present disclosure may include an apparatus for taking a downhole measurement. The apparatus may include a sensor generating signals representative of a downhole parameter; and an electrocaloric material associated with the sensor. The sensor may include at least a photodiode. The electrocaloric material may be configured to have a phase transition Curie temperature within 20 degrees Celsius of the maximum nominal operating temperature of the sensor. The electrocaloric material may be configured to have a phase transition Curie temperature within 20 degrees Celsius of the maximum nominal temperature of a borehole environment proximate to the sensor during measurement. The electrocaloric material may be configured to have a phase transition Curie temperature above 200 degrees Celsius. The electrocaloric material may have a phase transition temperature, and the apparatus may include circuitry configured to apply the electric field when the temperature of the electrocaloric material is within 20 degrees Celsius of the phase transition temperature.

Another embodiment according to the present disclosure may include a system for taking a downhole measurement. The system may include a tool comprising: a tool body; a sensor responsive to a downhole parameter; an electrocaloric material associated with the sensor; circuitry configured to take a measurement in a borehole intersecting an earth formation when the sensor is cooled by the electrocaloric material; and a conveyance device configured to convey the tool in the borehole. The circuitry may be configured to take a measurement when the sensor is cooled to a target temperature by the electrocaloric material. The target temperature may be related to the phase transition Curie temperature of the electrocaloric material. The system may include shock absorbers isolating the electrocaloric material from the tool body. The system may include circuitry configured to repeat a measurement cycle in a borehole intersecting an earth formation. The measurement cycle may include i) applying an electric field to the electrocaloric material over a first time interval; ii) taking a measurement with the sensor while the sensor is in a target temperature range; and iii) allowing the sensor to return to a nominal borehole operating temperature by removing the electric field and waiting for a second time interval.

Circuitry as described above may include a processor and a non-transitory computer-readable medium product accessible to the processor comprising instructions for taking measurements and/or estimating at least one downhole parameter relating to an earth formation intersected by a borehole disposed on the medium that, when executed by a processor, cause the at least one processor to execute one or more methods or method components as described herein.

Examples of some features of the disclosure may be summarized rather broadly herein in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
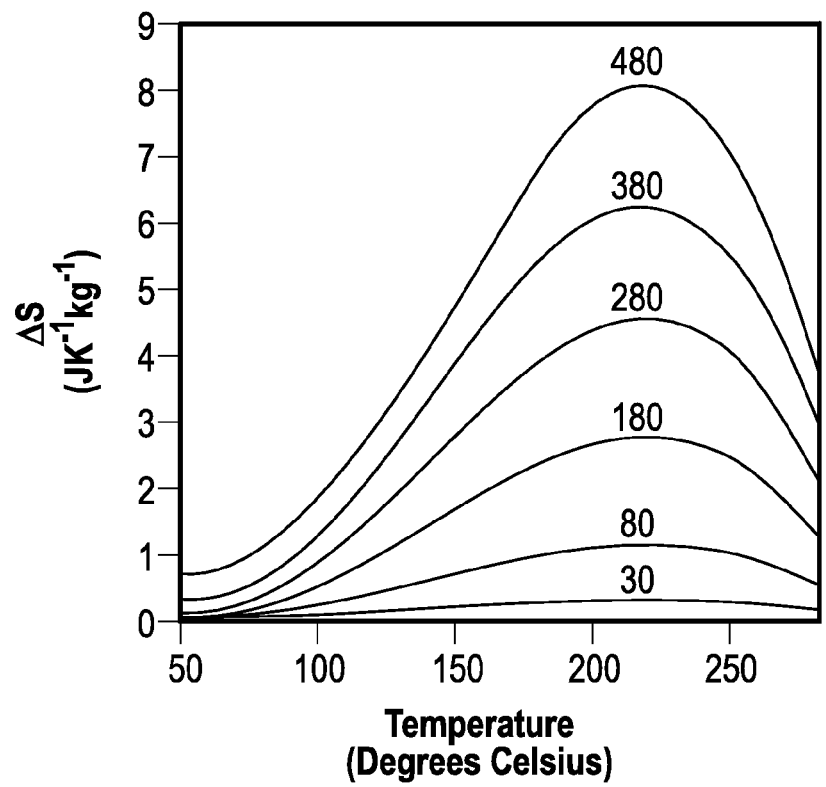
FIGS. 1 and 2 illustrate an electrocaloric effect for materials in accordance with embodiments of the present disclosure.

In aspects, this disclosure relates to taking a downhole measurement. Downhole measurement, as used herein, may be defined as a measurement taken in a borehole intersecting an earth formation indicative of a parameter of the borehole or the formation, exclusive of temperature, i.e., a downhole parameter. Method embodiments may include cooling a sensor in a borehole intersecting an earth formation using an electrocaloric material associated with the sensor, wherein the sensor is responsive to a downhole parameter. Cooling the sensor may place the temperature of the sensor in an operational temperature range for the sensor.

The environment in subterranean wells presents a harsh environment. Maintaining proper operation of tools in the downhole environment may be challenging, due to temperature and vibration. Instruments exposed to downhole fluids may suffer corrosive effects as well.

With increasing depth, the ambient temperature of the borehole environment becomes especially problematic. Most hydrocarbon wells will reach temperatures of at least 150 degrees Celsius. More challenging wells may reach temperatures of at least 175 degrees Celsius. High downhole temperatures may reach 200 degrees Celsius (392 degrees Fahrenheit) or more. Space in a downhole carrier (conveyance device) may be limited to a few inches in diameter. Traditional cooling systems typically utilize large amounts of power and take up valuable space in the carrier. Such cooling systems may also be prone to failure.

High downhole temperatures negatively affect the performance of semiconductor based electronics. Some examples of semiconductor electronics that may require cooling include, but are not limited to, sensors, processors, amplifiers, digital-to-analog converters ('DACs'), analog-to-digital converters ('ADCs'), field programmable gate arrays ('FPGAs'), application specific integrated circuits ('ASICs') and the like.

Sensors such as photodiodes, charged coupled device ('CCD') arrays, and other light detectors, metal oxide semiconductors ('MOS'), metal oxide semiconductor field effect transistors ('MOSFET'), and ion-sensitive field-effect transistors ('IsFET') chemical sensors are some examples of semiconductor sensors used downhole that may be adversely affected by high temperatures.

Electromagnetic emitters (e.g., laser diodes, light emitting diodes (LEDs), superluminescent LEDs, etc.), which may be used in sensors and other components, may lose performance characteristics at downhole temperatures. High temperatures can cause drift, nonlinearity of response, reduced response, and even complete failure of such devices at elevated temperatures.

The shunt resistance of a photodiode may start out at one gigaohm at room temperature but drop to only 100 ohms at 175 C. When attempting to perform quantitative optical measurements downhole, it is necessary to account for the significantly reduced response of semiconductor based photo detectors at elevated temperatures. Similarly, laser diodes and LEDs suffer significant losses of emitted light intensity at elevated temperatures. Some sensors such as metal oxide semiconductor gas sensors must operate at a fixed, but elevated, temperature between as 175 Celsius and 200 Celsius.

Thus, cooling such a sensor for a short period to enable measurement by the sensor while at a reduced temperature may be beneficial, especially if the reduced temperature lies within the nominal temperature range (or, better, the optimal temperature range) of sensor operation.

In aspects of the invention, the sensor is cooled using the electrocaloric effect. The sensor may be cooled by using an electrocaloric material associated with the sensor, such as, for example, fixed to the sensor, or in thermal connection with the sensor, or the like. The sensor may be a sensor such as an absorption spectrometer, a florescence spectrometer, refractometer, photodiode based inertial guidance sensor, and so on.

The electrocaloric effect may be defined as a reversible temperature change experienced by a material (e.g., an electrocaloric material) in response to an applied electric field. The mechanism underlying the effect remains unsettled, but has been characterized as an entropy change near a phase transition, a coupling between the electrical and thermal properties of a dielectric solid wherein temperature changes under adiabatic conditions in the presence of an applied electric field, or a change in temperature of a dielectric material due to electric field induced changes in dipolar states.

Electrocaloric cooling may be maximized near a phase transition of the electrocaloric material. Conventional cooling methods are inefficient in the very high temperature range (e.g., 200-250 C). Thus, it may be beneficial to select an electrocaloric material having a Curie temperature for a ferroelectric phase transition within this range. Electrocaloric cooling is also generally more efficient than traditional active cooling methods in terms of space and energy requirements.

Aspects of the present disclosure allow for cooling the sensor to a reduced temperature for a short period. By reduced temperature it is meant a temperature lower than the nominal temperature of the sensor while at a location in the borehole where the sensor will be used. The term "short period" may vary widely, but generally may refer to a period of duration on the order of seconds, or less. The duration of such a short period may be substantially the same as the amount of time necessary to cool the sensor for a measurement.

For example, aspects of the present disclosure may allow for intermittent measurements by a sensor in environments experiencing the highest downhole temperatures (e.g., above 200 degrees Celsius). The sensor may be cooled, for example, for a few seconds. At a target temperature (e.g., approximately the lowest temperature to be achieved), the measurement is taken. The sensor may be allowed to return to its nominal (e.g., uncooled) temperature for the current environment, until the next measurement cycle begins. The waiting time between cooling may be on the order of minutes or longer.

In other embodiments, multiple measurements may be taken, or continuous measurements may be taken for a period during cooling. The sensor may be cooled again as soon as cooling is available.

The electrocaloric material may be any electrocaloric material having properties sufficient for cooling the sensor. Such materials may include various perovskite structure thin films, such as antiferroelectric thin films of Zr rich Pb(Zr, Ti)$O_3$ ('PZT'), PbZr$_{0.48}$Ti$_{0.52}$O$_3$, relaxor ferroelectric films (e.g., Pb(Mg$_{0.33}$Nb$_{0.67}$)O$_3$), ferroelectric lithium niobate, ferroelectric polymers such as P(VDF-TrFE), and so on.

Electrical insulators (dielectrics) do not have charges that are free to move as charges would be in electrical conductors. The term, dielectrics, is most often used when an electrical insulator has high polarizability, which is the ability to separate the centers of positive and negative charge. There are three types of polarization that can occur separately or in combination; they are: 1) electronic, 2) atomic, and 3) ionic.

Electronic polarization occurs when an electric field pulls a negatively charged electron cloud in one direction while it pushes the positively charged nucleus in the opposite direction. Polarization equals the charge times the separation distance, which for electronic polarization is a tiny fraction of an atomic radius so electronic polarization is an extremely weak effect. When two atoms share electrons in a covalent bond, they usually do not share them equally—instead, the electrons stay near one more than the other, causing a separation of positive and negative centers of charge. Reorientation of such electric dipoles in an external electric field is called atomic polarization and this effect is significantly larger than electronic polarization because of the larger dipole arm. An ion takes an electron from another atom or it give up an electron to another atom so that the electron is no longer shared. Relocating that ion within a lattice leads to the largest dipole arm change and corresponding polarization change.

Dielectrics can be paraelectric or ferroelectric and phase transitions can occur between them. There can be field-induced paraelectric-ferroelectric phase transitions as well as temperature induced transitions at the Curie temperature in which the lattice structure changes with temperature. Ferroelectric materials that undergo gradual phase transitions near their Curie temperatures are expected to have smaller electrocaloric effects than those with discontinuous phase transitions. Also, the electrocaloric effect is expected to be largest at temperatures near their ferroelectric Curie point. Electrocaloric cooling increases with increasing electric field.

What distinguishes the two types of dielectrics is that ferroelectric materials do not lose their ionic polarization when the field is removed but paraelectrics do. The ferroelectric, barium titanate ($BaTiO_3$), has a perovskite crystal structure. A titanium cation sits at the center and can shift back and forth within the crystal lattice by a distance larger than the ions can move in a typical paraelectric such as tantalum oxide ($Ta_2O_5$). This motion creates a considerably larger dipole arm than is possible in tantalum oxide resulting in a much larger dielectric constant, which can be several orders of magnitude larger. In barium titanate, due to the lattice hindrances, the titanium ion can stay shifted to one side even after the external electric field is removed, which is what gives its ferroelectric residual polarization behavior. That is, the electric field can pull the ions into configurations that do not relax back to the previous state once the field is removed.

The paper "Giant electrocaloric effect in thin film $PbZr_{0.95}Ti_{0.05}O_3$," by Mischenko et al (hereinafter, 'Mischenko') describes achieving a coefficient of performance approaching 50 percent of the Carnot limit, i.e., a cooling power of approximately 50 watts from an input of several watts. Because the material's ferroelectric Curie temperature phase transition is at approximately 222 Celsius (phase transition temperature, $T_C$), it is most efficient in the very high temperature region (e.g., 200-250 C) for boreholes, where other cooling methods may be ineffective or problematic to implement.

Figure 2:
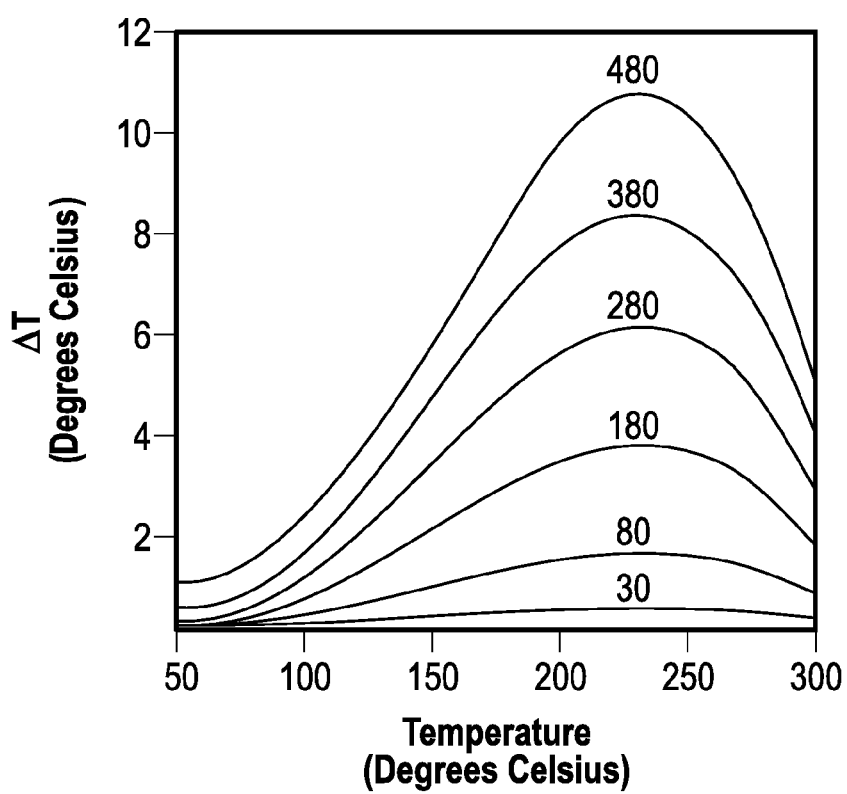

FIG. 1 shows electrocaloric entropy changes associated with the ferroelectric-paraelectric transition of thin film $PbZr_{0.95}Ti_{0.05}O_3$. FIG. 2 shows temperature changes corresponding to the entropy changes of FIG. 1. The drawings are representative of the findings of Mischenko. The largest change is 12 degrees Celsius in 25 V (i.e. 0.48 K V−1) at $T_{EC}$=226 Celsius. The effects persist both above and below $T_C$=222 Celsius.

Mischenko further notes that bulk Pb(Zr0.95Ti0.05)O3 is an orthorhombic antiferroelectric at room temperature. On heating to approximately 120 degrees Celsius, this structure transforms to a rhombohedral ferroelectric phase. There is substantial thermal hysteresis in this antiferroelectric to ferroelectric transition, which on cooling occurs at approximately 80 degrees Celsius. The structure transforms to cubic paraelectric above 242 degrees Celsius. This is a first-order phase transition with a Curie-Weiss temperature behavior.

A possible disadvantage of thin films is that they may be thermally anchored by substrates, which reduces heat pump capability and cooling power. A multilayer film structure with metallic electrodes may be used to mitigate this feature. Compared with films and bulk materials, multilayer structures may avoid a substrate and increase the volume of the electrocaloric material, which may enhance the efficiency of the heat exchange while keeping the high breakdown field of films. However, multilayer structures may feature a lower temperature change effect.

The paper "Compact Cooling Devices Based on Giant Electrocaloric Effect Dielectrics," by Li et al ('Li') describes achieving a 30 degree (Celsius) temperature gradient across two sides of a 1 centimeter device using P(VDF-TrFE) 68/32 copolymer as the electrocaloric material. The size of the gradient is one factor recommending a material for use in the present disclosure.

Figure 3:
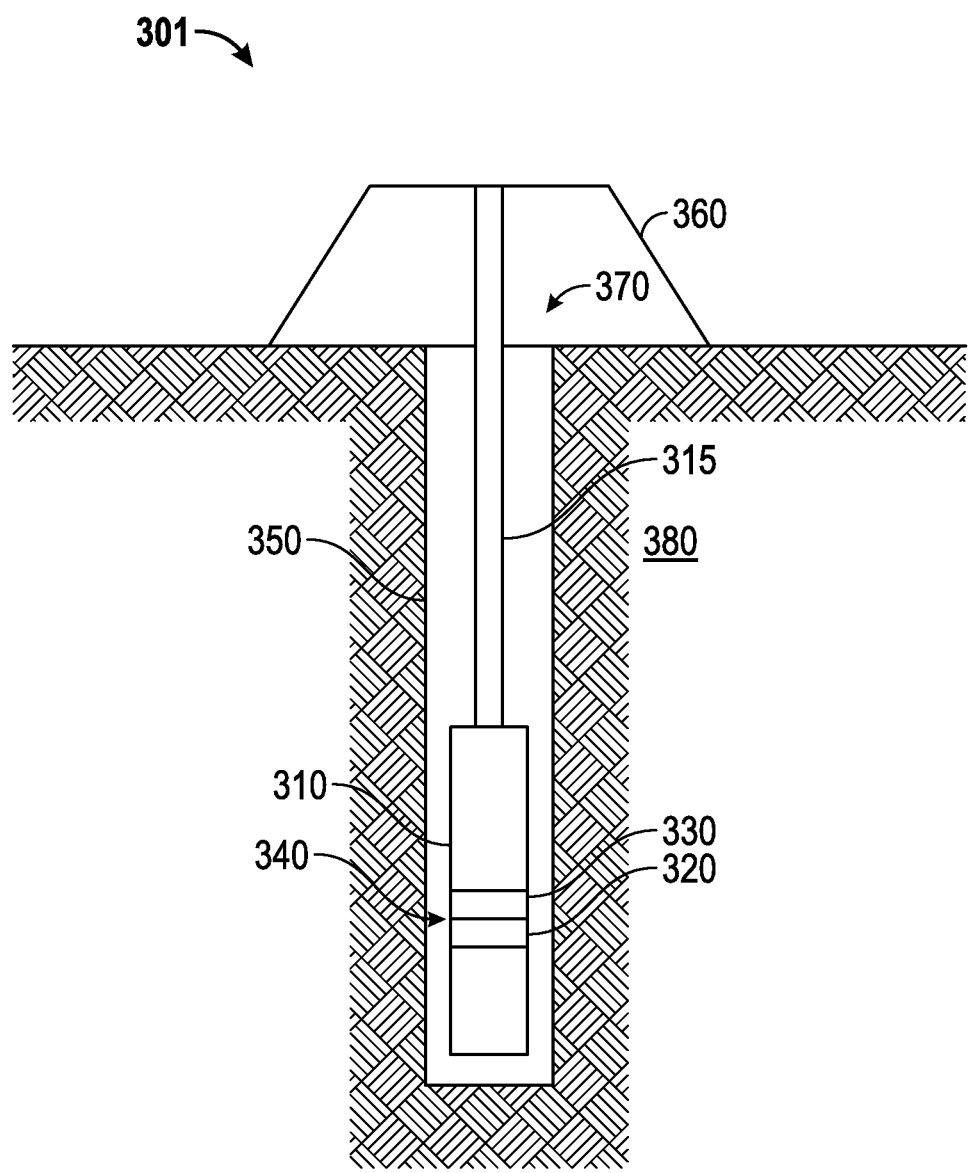
FIG. 3 shows a diagram of a downhole tool deployed in a borehole in accordance with embodiments of the present disclosure.

Each of the embodiments herein may be used in a variety of settings in both drilling and non-drilling environments. In some implementations, the disclosed embodiments may be used as part of a drilling system. An example drilling system for use in conjunction with LWD is illustrated herein. FIG. 3 schematically illustrates a drilling system 301 having a downhole tool 310 configured to acquire information for downhole fluid analysis in a borehole 350 intersecting a formation 380. In one illustrative embodiment, the tool 310 may contain a sensor unit 340, such as, for example, a fluid analysis spectrometer. The sensor unit includes a sensor 330 (e.g., photodiode) cooled by an electrocaloric material, as well as other sensors 320. Sensors 320, 330 may detect one or more parameters of a formation. Parameters of a formation may include information relating to a geological parameter, a geophysical parameter, a petrophysical parameter, and/or a lithological parameter. Thus, the sensors 320, 330 may include sensors for estimating formation resistivity, dielectric constant, the presence or absence of hydrocarbons, acoustic porosity, bed boundary, formation density, nuclear porosity and certain rock characteristics, permeability, capillary pressure, and relative permeability. Sensors 320, 330 may detect one or more parameters of a the wellbore, including parameters relating to downhole fluids. Non-limiting examples of downhole fluids include drilling fluids, return fluids, formation fluids, production fluids containing one or more hydrocarbons, oils and solvents used in conjunction with downhole tools, water, brine, engineered fluids, and combinations thereof.

The system 301 may include a conventional derrick 360 erected on a derrick floor 370. A conveyance device (carrier 315) which may be rigid or non-rigid, may be configured to convey the downhole tool 310 into wellbore 350 in proximity to formation 380. The carrier 315 may be a drill string, coiled tubing, a slickline, an e-line, a wireline, etc. Downhole tool 310 may be coupled or combined with additional tools (e.g., some or all the information processing system of FIG. 3). Thus, depending on the configuration, the tool 310 may be used during drilling and/or after the wellbore (borehole) 350 has been formed. While a land system is shown, the teachings of the present disclosure may also be utilized in offshore or subsea applications. The carrier 315 may include embedded conductors for power and/or data for providing signal and/or power communication between the surface and downhole equipment. The carrier 315 may include a bottom hole assembly, which may include a drilling motor for rotating a drill bit.

In order to operate the downhole tool 310 and/or provide a communications interface with at least one processor at the surface, the downhole tool 310 may include a downhole processor (not shown). In one embodiment, electronics (not shown) associated with the sensors may be configured to record information related to the parameters to be estimated. In some embodiments, the parameter of interest may be estimated using the recorded information.

In other embodiments, such electronics may be located elsewhere (e.g., at the surface). To perform estimation of a parameter during a single trip, the tool may use a "high bandwidth" transmission to transmit the information acquired by sensors to the surface for analysis. For instance, a communication line for transmitting the acquired information may be an optical fiber, a metal conductor, or any other suitable signal conducting medium. It should be appreciated that the use of a "high bandwidth" communication line may allow surface personnel to monitor and control the treatment activity in "real time."

In some embodiments, processors may include electromechanical and/or electrical circuitry configured to control one or more components of the tool 310. In other embodiments, processors may use algorithms and programming to receive information and control operation of the tool 310. Therefore, processors may include an information processor that is in data communication with a data storage medium and a processor memory. The data storage medium may be any standard computer data storage device, such as a USB drive, memory stick, hard disk, removable RAM, EPROMs, EAROMs, flash memories and optical disks or other commonly used memory storage system known to one of ordinary skill in the art including Internet based storage. The data storage medium may store one or more programs that when executed causes information processor to execute the disclosed method(s). Herein, "information" may include raw data, processed data, analog signals, and digital signals.

Figure 4A:
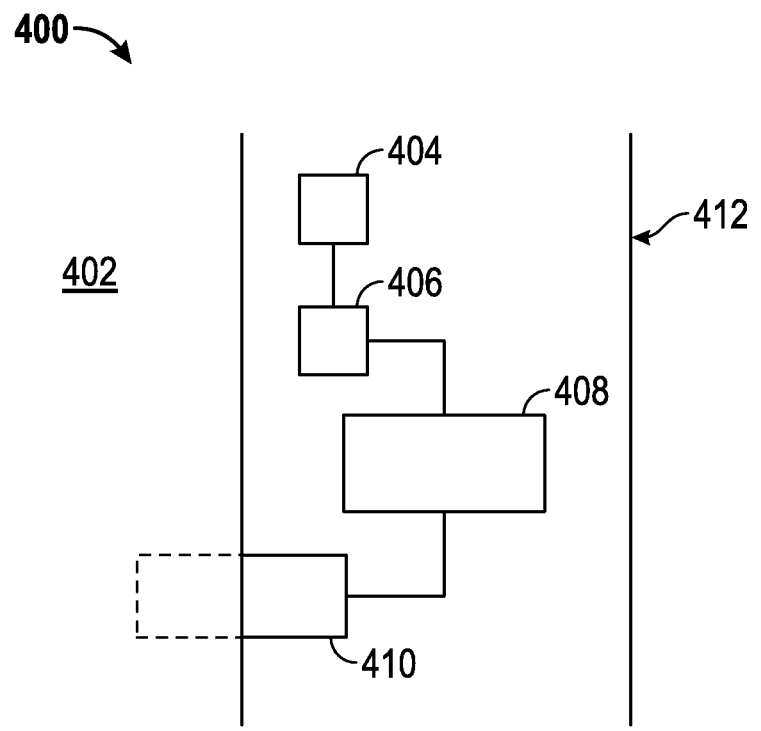
FIGS. 4A and 4B illustrate tools including sensors in accordance with embodiments of the present disclosure.
Figure 4B:
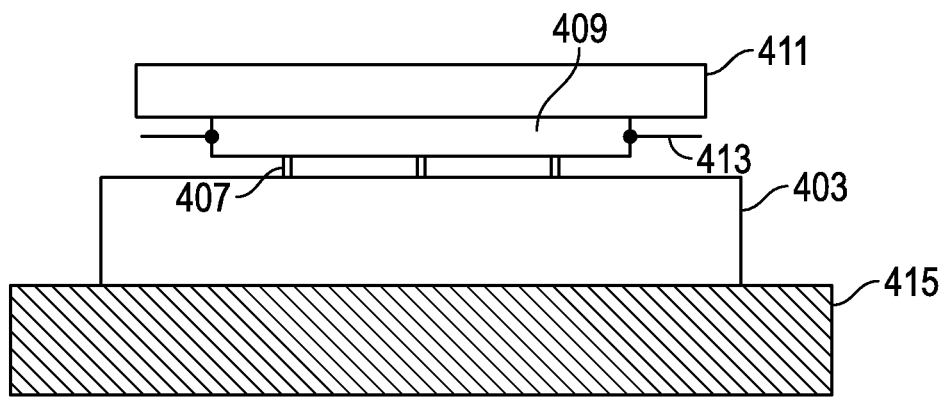

FIGS. 4A and 4B illustrate a tool including a sensor in accordance with embodiments of the invention. Referring to FIG. 4A, tool 400 is configured to be conveyed in a borehole 350. A sensor 410 configured to measure a downhole parameter is mounted on the tool 400. Sensor 410 may be any of the sensors disclosed herein. In some embodiments, some (or all) of the sensor 410 may protrude from the tool body 412 into the borehole 402. In other embodiments, the tool 400 may include a fluid testing assembly configured to extract downhole fluid from the borehole and deliver the fluid to the sensor for testing. The fluid testing assembly may include a sample chamber which may be filled and emptied via the use of various valves, or may operate using a continuous flow line. The sensor 410 may include a photodiode, or other semiconductor elements sensitive to temperature. In particular embodiments, the sensor may be a downhole fluid analysis spectrometer. The spectrometer may illuminate the fluid. Light reflected from the sample or transmitted through the sample may be measured via spectrometry to determine a non-temperature property of the fluid, the borehole, or the formation (e.g., a downhole parameter). That is, the light response is detected and converted to an electrical signal using a photodetector (e.g., a photodiode), and information embodied by the electrical signal is processed to estimate downhole parameters.

Actuating the electrocaloric material 408 causes the sensor 410 to cool. The sensor 410 may then operate in a cooled state (e.g., a reduced temperature). The reduced temperature may lie within the nominal temperature range or the optimal temperature range for operation of the sensor 410. Electrocaloric material 408 may be configured to place the sensor 410 at the particular reduced temperature or within the temperature range (i.e., the 'target temperature') upon actuation. For example, the particular material and the dimensions may be selected to place the sensor 410 at the particular reduced temperature or within the temperature range. For a photodiode, the target temperature may be approximately 175 degrees or 200 degrees Celsius, or approximately 10-30 degrees Celsius lower than the nominal sensor temperature in a high temperature wellbore environment.

The electrocaloric material 408 may be actuated via a voltage source 406 providing an electric field. The voltage source may be configured to produce an electric field selected, along with the material and dimensions of the electrocaloric material 408 to place the sensor 410 at the particular reduced temperature or within the temperature range upon actuation. Materials, dimensions, and characteristics of the electric field may be selected to be sufficient to reduce the nominal temperature of the sensor by at least 10 Kelvins, at least 20 Kelvins, or approximately 30 Kelvins, or more.

Tool 400 may include circuitry for making measurements when the sensor 410 is cooled. Circuitry may include controller 404 operably connected to voltage source 406 to control the voltage source 406. Controller 404 may be implemented as the at least one processor described above with reference to FIG. 3 or may be an additional processor or other supporting circuitry. Controller 404 may be located at the sensor, at other locations in the tool (including, for example, in other subs), or at the surface.

Referring to FIG. 4B, a thin film of electrocaloric material 409 is mounted on a substrate 403 using a plurality of protrusions 407 (e.g., "stilts") extending from the substrate 403 to thermally isolate the film 409 from the surrounding environment, allowing for faster and more efficient cooling. The electrocaloric material 409 may be configured to have a phase transition Curie temperature above 200 degrees Celsius, in order to maximize cooling in conditions where operation of other cooling systems may be problematic. Sensor 411 is thermally connected (e.g., coupled) to the electrocaloric material 409 through physical contact, either directly or indirectly (e.g., via a conductor). In other implementations, the electrocaloric material 409 and the sensor 411 may be placed in contact with the same conducting fluid (not shown). The system may be thermally isolated (e.g., in a vacuum). The electrocaloric material may alternatively be formed with the sensor or components thereof, e.g., contained within the die (not shown). Electrical contacts 413 fastened to or formed integrally with the electrocaloric material 409 allow the application of voltage. Upon application of voltage, the electrocaloric material 409 cools. At a target temperature, or proximate to the lowest achievable temperature, the sensor 411 is operated. The sensor 411 may be controlled by controller 404 or another processor. To protect electrocaloric material 409, shock absorbers 415 absorb shock and vibration from the tool body.

Figure 5:
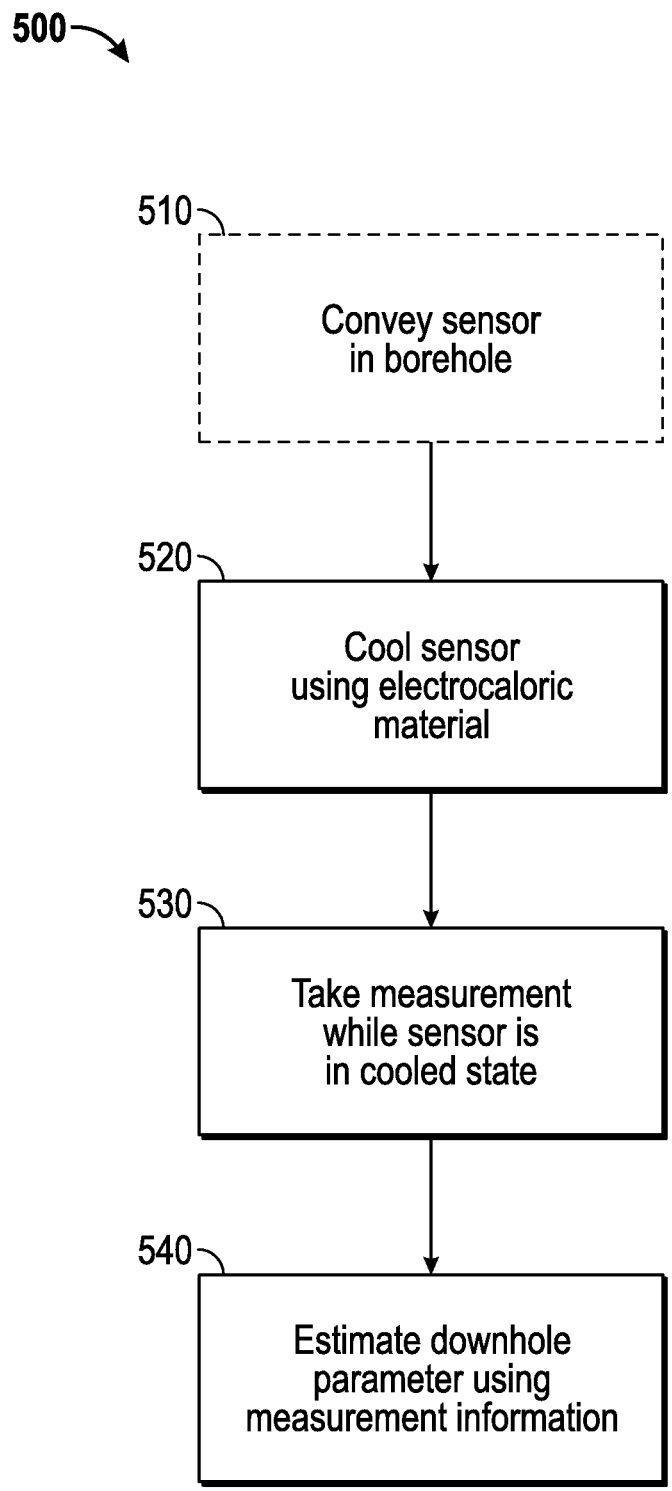
FIG. 5 shows a flow chart for a method in accordance with embodiments of the present disclosure.

FIG. 5 shows a flow chart 500 for estimating at least one downhole parameter according to one embodiment of the present disclosure. In optional step 510, a sensor responsive to a downhole parameter is conveyed in the borehole using a carrier. In the borehole, a downhole measurement is made. Step 520 includes cooling the sensor using an electrocaloric material associated with the sensor. Cooling may be carried out by applying an electric field to the electrocaloric material to generate a giant electrocaloric effect. Giant electrocaloric effect, as used herein, may refer to an electrocaloric effect resulting in a temperature change to the material of 5 degrees Celsius or more. Cooling, cooled state, and reduced temperature, as used herein, refer to a temperature lower than the nominal temperature of the sensor while at a location in the borehole where the sensor will be used. Thus, if the ambient temperature of the borehole is rising (for example, due to increased depth), the sensor may still be considered cooled even when the temperature is rising, if the temperature of the sensor is not rising to a level it would otherwise obtain if not for the actuation of the electrocaloric material.

In step 530, measurement may be taken while the sensor is in a cooled state. Thus, step 530 may include determining timing of actuating the sensor to take measurements. The step may be configured to take measurements when the sensor is proximate to a target temperature or in a temperature range. The target temperature may be proximate to the phase transition Curie temperature of the electrocaloric material. The method may include selecting the electrocaloric material to have a phase transition Curie temperature within 20 degrees Celsius of the maximum nominal operating temperature of the sensor, and applying the electric field when the temperature of the electrocaloric material is within 20 degrees Celsius of the phase transition temperature. The method may be carried out by applying the electric field when the temperature of the electrocaloric material is within 10 degrees Celsius, 5 degrees Celsius, 3 degrees Celsius, 2 degrees Celsius, 1 degree Celsius, or less than 1 degree Celsius of the phase transition temperature.

Step 530 may be carried out by sensing the temperature of the sensor, or the temperature of the electrocaloric material, to determine when a target temperature is reached. Alternatively or additionally, the temperature of the sensor may be derived from the temperature of the electrocaloric material, or ambient temperature of the tool or of the borehole fluid. Timing of measurements may also be calculated using pre-determined data tables which may be adjusted for calibration, and thus may include a calculated or preset amount of time from actuation of the electrocaloric material. Empirical data may be used to model temperature behavior and measurement quality.

In some embodiments, step 530 may include repeating a measurement cycle comprising: i) applying the electric field over a first time interval; ii) taking the downhole measurement with the sensor while the sensor is in a target temperature range; and iii) allowing the sensor to return to a nominal borehole operating temperature by removing the electric field and waiting for a second time interval. In other embodiments, step 530 may include cooling the sensor by applying the electric field to a plurality of cooling members in sequence, with each cooling member comprising the electrocaloric material.

In step 540, a downhole parameter may be estimated using information relating to the downhole measurement from the sensor. Herein, "information" may include raw data, processed data, analog signals, and digital signals. Estimation of the parameter may include the use of a model. In some embodiments, the model may include, but is not limited to, one or more of: (i) a mathematical equation, (ii) an algorithm, (iii) an deconvolution technique, and so on. The at least one parameter of interest may include, but is not limited to, one or more of: (i) viscosity, (ii) chemical composition, (iii) permittivity, (iv) density.

In some aspects, this disclosure relates to estimating a parameter of interest related to a volume of an earth formation, such as, for example, an earth formation surrounding a borehole. The parameter of interest may be a physical characteristic of the volume, such as, for example, density.

The term "conveyance device" as used above means any device, device component, combination of devices, media and/or member that may be used to convey, house, support or otherwise facilitate the use of another device, device component, combination of devices, media and/or member. Exemplary non-limiting conveyance devices include drill strings of the coiled tube type, of the jointed pipe type and any combination or portion thereof. Other conveyance device examples include casing pipes, wirelines, wire line sondes, slickline sondes, drop shots, downhole subs, BHA's, drill string inserts, modules, internal housings and substrate portions thereof, self-propelled tractors. As used above, the term "sub" refers to any structure that is configured to partially enclose, completely enclose, house, or support a device. By "uncooled" it is meant without active cooling using the electrocaloric effect, as contrasted with insulation or other passive temperature control measures. The term "information" as used above includes any form of information (Analog, digital, EM, printed, etc.). The term "information processing device" herein includes, but is not limited to, any device that transmits, receives, manipulates, converts, calculates, modulates, transposes, carries, stores or otherwise utilizes information. An information processing device may include a microprocessor, resident memory, and peripherals for executing programmed instructions. "Thin film", as used herein, may refer to a thickness of 1 to 500 nanometers. Nominal temperature of a sensor may be defined as the temperature the sensor would be but for the effects of active cooling by the electrocaloric material. Active cooling refers to cooling achieved by the electrocaloric effect. The target temperature range is the desired or planned temperature of the sensor for taking measurements. Thermal connection, as referred to herein, means a connection which results in substantial change of one of the elements with respect to the other. A sensor may be said to be in thermal connection with the electrocaloric material if a temperature change in the material produces a corresponding change of temperature in the sensor of at least 25 percent of the change in the electrocaloric material.

While the foregoing disclosure is directed to the one mode embodiments of the disclosure, various modifications will be apparent to those skilled in the art. It is intended that all variations be embraced by the foregoing disclosure.

What is claimed is:

1. A method of taking a downhole measurement, the method comprising:
   performing a measurement cycle comprising:
   cooling a sensor in a borehole intersecting an earth formation using an electrocaloric material associated with the sensor by applying an electric field to the electrocaloric material over a first time interval to generate a giant electrocaloric effect;
   taking the downhole measurement with the sensor while the sensor is in a target temperature range; and
   allowing the sensor to return to a nominal borehole operating temperature by removing the electric field and waiting for a second time interval before repeating the measurement cycle.

2. The method of claim 1, further comprising selecting dimensions of the electrocaloric material and characteristics of the electric field sufficient to reduce the nominal temperature of the sensor by at least 20 degrees Celsius.

3. The method of claim 1, wherein the sensor is fixed to the electrocaloric material.

4. The method of claim 1, wherein the sensor is in thermal connection with the electrocaloric material.

5. The method of claim 1, wherein the electrocaloric material is configured to have a phase transition Curie temperature above 200 degrees Celsius.

6. The method of claim 1, further comprising:
 selecting the electrocaloric material to have a phase transition Curie temperature within 20 degrees Celsius of the maximum nominal operating temperature of the sensor; and
 applying the electric field when the temperature of the electrocaloric material is within 20 degrees Celsius of the phase transition temperature.

7. The method of claim 1, further comprising taking the downhole measurement using the sensor during the cooling.

8. The method of claim 1, further comprising cooling the sensor by applying the electric field to a plurality of cooling members in sequence, each cooling member comprising the electrocaloric material.

9. An apparatus for taking a downhole measurement, the apparatus comprising:
 a sensor generating signals representative of a downhole parameter, wherein the sensor comprises at least a photodiode; and
 an electrocaloric material associated with the sensor.

10. The apparatus of claim 9, wherein the electrocaloric material is configured to have a phase transition Curie temperature within 20 degrees Celsius of the maximum nominal operating temperature of the sensor.

11. The apparatus of claim 9, wherein the electrocaloric material is configured to have a phase transition Curie temperature within 20 degrees Celsius of the maximum nominal temperature of a borehole environment proximate to the sensor during measurement.

12. The apparatus of claim 9, wherein the electrocaloric material is configured to have a phase transition Curie temperature above 200 degrees Celsius.

13. The apparatus of claim 9, wherein the electrocaloric material has a phase transition temperature, the apparatus further comprising circuitry configured to apply the electric field when the temperature of the electrocaloric material is within 20 degrees Celsius of the phase transition temperature.

14. A system for taking a downhole measurement, the system comprising:
 a tool comprising:
  a tool body;
  a sensor generating signals representative of a downhole parameter;
  an electrocaloric material associated with the sensor; and
  circuitry configured to perform a measurement cycle in a borehole intersecting an earth formation, the measurement cycle comprising:
   i) applying an electric field to the electrocaloric material over a first time interval;
   ii) taking a measurement with the sensor while the sensor is in a target temperature range; and
   iii) allowing the sensor to return to a nominal borehole operating temperature by removing the electric field and waiting for a second time interval before repeating the measurement cycle; and
 a conveyance device configured to convey the tool in the borehole.

15. The system of claim 14 further comprising shock absorbers isolating the electrocaloric material from vibrations in the tool body.

* * * * *